United States Patent
Warner et al.

(10) Patent No.: US 9,630,146 B2
(45) Date of Patent: Apr. 25, 2017

(54) PARTICULATE FILTER CONTAINING A NICKEL-COPPER CATALYST

(71) Applicant: Ford Global Technologies, LLC, Dearborn, MI (US)

(72) Inventors: James Robert Warner, Grosse Pointe Farms, MI (US); Douglas Allen Dobson, Ypsilanti, MI (US); Hungwen Jen, Troy, MI (US); Giovanni Cavataio, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 700 days.

(21) Appl. No.: 13/908,475

(22) Filed: Jun. 3, 2013

(65) Prior Publication Data
US 2014/0356240 A1 Dec. 4, 2014

(51) Int. Cl.
*B01D 53/94* (2006.01)
*B01J 23/755* (2006.01)

(52) U.S. Cl.
CPC .......... *B01D 53/945* (2013.01); *B01J 23/755* (2013.01); *B01D 2255/20753* (2013.01); *B01D 2255/20761* (2013.01); *B01D 2255/65* (2013.01); *B01D 2255/908* (2013.01); *B01D 2258/012* (2013.01); *Y02T 10/22* (2013.01)

(58) Field of Classification Search
None
See application file for complete search history.

(56) References Cited

U.S. PATENT DOCUMENTS

| | | |
|---|---|---|
| 3,098,829 A | 7/1963 | White et al. |
| 3,985,683 A | 10/1976 | Stenzel |
| 4,006,103 A | 2/1977 | Meguerian et al. |
| 4,012,485 A | 3/1977 | Meguerian et al. |
| 4,111,849 A | 9/1978 | Fedor |
| 4,654,319 A | 3/1987 | Kim et al. |

(Continued)

FOREIGN PATENT DOCUMENTS

| | | |
|---|---|---|
| JP | 1339144 A | 5/1989 |
| WO | 2007064808 A1 | 6/2007 |
| WO | 2008132452 A2 | 11/2008 |

OTHER PUBLICATIONS

Zuberi et al. Beyond Traditional Ceramic Honeycombs. Ci Ceramic Industry Magazine. 2008, pp. 1-9. http://www.ceramicindustry.com/articles/88764-beyond-traditional-ceramic-honeycombs.*

(Continued)

*Primary Examiner* — Walter D Griffin
*Assistant Examiner* — Jelitza Perez
(74) *Attorney, Agent, or Firm* — Damian Porcari; McCoy Russell LLP

(57) ABSTRACT

A particulate filter for use in a vehicle engine exhaust is provided which includes a catalyst containing a mixture of nickel and copper. The catalyst is impregnated into the filter substrate, which is non-reactive with nickel and copper. When used in a vehicle exhaust gas treatment system, the catalyst on the filter improves soot burn-off at low temperatures, provides improved efficiency in reducing CO and $NO_x$ emissions over the use of conventional three-way-catalyst washcoats, and provides enhanced oxygen storage capacity (OSC) and water-gas-shift (WGS) functions.

20 Claims, 5 Drawing Sheets

(56) References Cited

U.S. PATENT DOCUMENTS

| | | | |
|---|---|---|---|
| 4,711,870 A * | 12/1987 | Yamada et al. | 502/303 |
| 5,182,249 A | 1/1993 | Wang et al. | |
| 5,534,475 A | 7/1996 | Miramontes Cardenas et al. | |
| 5,688,740 A | 11/1997 | Bolshakov et al. | |
| 5,795,553 A | 8/1998 | Lott et al. | |
| 6,074,973 A | 6/2000 | Lampert et al. | |
| 6,143,261 A | 11/2000 | Lissy et al. | |
| 6,167,696 B1 | 1/2001 | Massiedvaag et al. | |
| 6,231,817 B1 | 5/2001 | Shimoda et al. | |
| 6,779,338 B1 | 8/2004 | Lewis | |
| 6,841,512 B1 | 1/2005 | Fetcenko et al. | |
| 6,887,438 B2 | 5/2005 | Labarge et al. | |
| 7,625,529 B2 | 12/2009 | Ohno et al. | |
| 7,678,734 B2 | 3/2010 | Chigapov et al. | |
| 7,758,834 B2 | 7/2010 | Chen et al. | |
| 7,913,672 B2 | 3/2011 | Elwart et al. | |
| 8,112,985 B2 | 2/2012 | Uhrich et al. | |
| 8,161,733 B2 | 4/2012 | Uhrich et al. | |
| 2006/0216227 A1 | 9/2006 | Idem et al. | |
| 2007/0166826 A1 | 7/2007 | Stockwell | |
| 2009/0304566 A1 | 12/2009 | Golden et al. | |
| 2011/0056269 A1 | 3/2011 | Odendall et al. | |
| 2011/0061371 A1 | 3/2011 | Cavataio et al. | |
| 2011/0072801 A1 | 3/2011 | Lupescu et al. | |
| 2013/0202508 A1 * | 8/2013 | Hepburn | B01D 53/56 423/213.5 |

OTHER PUBLICATIONS

Scherzer et al. (Impregnation. Catalyst Preparation and Manufacturing. Hydrocracking Science and Technology. 1996, p. 45. https://books.google.com/books?id=ZklQ5x_v6W0C&pg=PR7&dq=immersion+method+dipping+impregnation&source=gbs_selected_pages&cad=2#v=onepage&q=immersion%20method%20dipping%20impregnation&f=false.*

Villegas et al., "Wet imprenation of alumina-washcoated monoliths: Effect of the drying procedure on Ni distribution and on autothermal reforming activity", Applied Catalysis A: General, vol. 320, pp. 43-55, Mar. 22, 2007.

El-Shobaky et al., "Nickel cuprate supported on cordierite as an active catalyst for CO oxidation by O2", Applied Catalysis B: Environmental, vol. 63, Issues 3-4, pp. 168-177, Mar. 31, 2006.

Loof et al., "Oxygen storage capacity of noble metal car exhaust catalysts containing nickel and cerium", Journal of Catalysis, vol. 118, Issue 2, pp. 339-348, Aug. 1989.

Lin et al., "Supported Copper, Nickel and Copper-Nickel Nanoparticle Catalysts for Low Temperature Water-Gas-Shift Reaction", OhioLink EDT Center, http://etd.ohiolink.edu/view.cgi?acc_num=ucin1327068565, (2012).

Dastanian et al., "Desulfurization of Gasoline over Nanoporous Nickel-Loaded Y-Type Zeolite at Ambient Conditions", American Chemical Society, Ind. Eng. Chem. Res., 49, pp. 11254-11259, 2010.

Muench et al., "Extruded Zeolite Based Honeycomb Catalyst for NOx Removal from Diesel Exhaust", SAE Technical Paper Series, 2008-01-1024, Apr. 14-17, 2008.

Marino et al., "Hydrogen production from steam reforming of bioethanol using Cu/Ni/K/y-Al2O3 catalysts. Effects of Ni", International Journal of Hydrogen Energy 26, pp. 665-668, (2001).

Kwak et al., "Hydrogen-rich gas production from ethanol steam reforming over Ni/Ga/Mg/Zeolite Y catalysts at mild temperature", Applied Energy, 88, pp. 4366-4375, 2011.

2013 Phd Degree Program, "Preparation and Property Research of the Copper-Based Three-Way Catalyst Doped with Nickel", Research-Degree.com, http://www.12340000.com/science-engineering-b/chemistry/1468.html.

"Catalytic Coating & Materials" Accessed at https://www.dieselnet.com/tech/cat_malphp, 2 pages, accessed on May 16, 2016.

* cited by examiner

PARTICULATE FILTER CONTAINING A NICKEL-COPPER CATALYST

BACKGROUND OF THE INVENTION

Embodiments described herein relate to a particulate filter for capturing particulates in the exhaust of a gasoline or diesel engine, and more particularly, to a particulate filter including a catalyst comprising a mixture of nickel and copper.

In recent years, government regulations in the United States have restricted particulate emissions, which has necessitated improvements in the removal of particulates from diesel and gasoline engine emissions. Such particulates generally consist of carbonaceous particulates in the form of soot. Currently, the most commonly used method for removing soot from engine exhaust is the use of a particulate filter positioned in the engine exhaust which collects soot while allowing exhaust gases to pass through. The collected particulate matter is then burned off (oxidized) at elevated temperatures to clean and regenerate the filter. Regeneration of the deposited particulates must occur in order to prevent the filter from becoming plugged, which can cause an undesirable rise in back pressure to the engine.

However, most commercial filters currently in use are ineffective at burning the deposited particulates at the temperatures encountered under normal operating conditions. In order to lower the burn-off temperature, catalyst washcoats have been applied to the filters to promote soot burning at lower temperatures, typically in the range of about 300° C. to 400° C. Such washcoats typically comprise precious metals such as platinum, palladium, and rhodium and support materials comprised of, for example, alumina, ceria, or ceria-zirconia. However, such catalyzed soot filters are typically expensive to produce due to the high cost of platinum group metals. Another disadvantage of such catalyzed filters is that the bulk of the washcoat is comprised of the support materials, with the active catalyst metals residing primarily in the internal pores of the support. Thus, the direct contact between the active metals and the deposited particulates is limited. While the amount of washcoat may be increased to enhance contact, this results in the undesirable effect of increased backpressure in the engine.

In addition, in situations where the temperature of the engine exhaust is high enough for regeneration, the engine may operate under conditions where there is insufficient oxygen for completing burn-off of the deposited particulates. While the addition of oxygen storage capacity (OSC) materials such as cerium-based oxides may provide additional oxygen, in some vehicle operations, conventional OSC materials do not generate sufficient amounts of oxygen needed for complete burn-off.

Accordingly, there is a need in the art for a particulate filter including a catalyst thereon which provides improved soot oxidation at low temperatures, which does not require the use of platinum group metals, which provides sufficient oxygen storage capacity for burn-off of particulates, and which does not cause an increase in engine back pressure.

SUMMARY OF THE INVENTION

Embodiments of the invention meet those needs by providing a particulate filter including a catalyst impregnated in the filter substrate which comprises a mixture of nickel and copper (also referred to herein as a nickel-copper catalyst). When placed in a vehicle exhaust, the filter containing the catalyst provides improved burn off of soot/carbon at low temperatures of from about 200° C. to 1000° C., improved rates of oxidation of CO, as well as improved reduction of nitrogen oxides, and provides sufficient oxygen storage capacity for the oxidation of soot and CO. The filter containing the nickel-copper catalyst also provides removal of carbon monoxide and $NO_x$ via a catalytic water-gas-shift (WGS).

According to one aspect of the invention, a particulate filter for use in a diesel or gasoline engine is provided comprising a filter substrate and a catalyst comprising a mixture of nickel and copper impregnated in the filter substrate, where the filter substrate is non-reactive with nickel and copper. By "non-reactive to nickel and copper," it is meant that the filter substrate contains no materials such as alumina or magnesium aluminate which could adversely react with copper or nickel and reduce the catalyst function or cause deactivation of the catalyst. By "impregnated," we mean that the catalyst permeates the filter, i.e., it is positioned within the walls of the filter and may also be present on the surface of the walls. This distribution of Ni—Cu provides direct contact of Ni—Cu particles and soot particulates on the filter walls, enhancing the efficiency of soot burning. The back pressure increase is also minimized, since there is no bulk support material potentially blocking the gas-permeating pores of the filter.

In one embodiment, the catalyst is substantially free of precious metals.

The filter substrate preferably comprises a material selected from the group consisting of metal oxides, cordierite, aluminum titanate, silicon carbide, and mullites. The nickel-copper catalyst is preferably impregnated in the filter substrate at a loading between about 0.1 and 100 wt %, and more preferably, from about 1.0 to about 50 wt % (based on the weight of the catalyst in relation to the weight of the substrate).

The nickel is preferably impregnated in the substrate at a loading of between about 0.1 and 99 wt %, and more preferably, about 10 wt % and the copper is preferably impregnated at a loading of between about 0.1 and 99 wt %, and more preferably, about 10 wt %.

In one embodiment, the weight ratio of nickel to copper in the mixture is from about 99:1 to 50:50. In another embodiment, the weight ratio of nickel to copper is from about 50:50 to 1:99. Preferably, the weight ratio of nickel to copper is from about 99:1 to 50:50.

In another embodiment of the invention, a method of providing a catalyst on a particulate filter is provided which includes providing a filter substrate which is nonreactive with nickel and copper; and impregnating the substrate with a catalyst comprising a mixture of: a nickel solution selected from nickel nitrate, nickel acetate, nickel carbonate, nickel sulfate, and combinations thereof; and a copper solution selected from copper nitrate, copper acetate, copper carbonate, copper sulfate, and combinations thereof.

In this method, the nickel and copper solutions are mixed together prior to being dispersed into the filter substrate such that the solution becomes impregnated in the filter.

In yet another embodiment of the invention, a vehicle exhaust treatment system is provided which comprises a particulate filter positioned in an exhaust stream, where the particulate filter includes an inlet, an outlet, and a plurality of porous walls. The filter comprises a substrate including the nickel-copper catalyst impregnated therein, where the filter substrate is non-reactive with nickel and copper.

The particulate filter preferably includes a plurality of channels separated by porous walls, where the channels are open at one end and plugged at the opposite end to trap particulates therein while the exhaust gas passes through the porous filter walls.

The exhaust treatment system including the filter burns off carbon and soot at a temperature of from about 200° C. to 1000° C. The exhaust treatment system including the filter/catalyst also exhibits a CO conversion efficiency of at least 90% at a temperature between about 200° C. to about 1000° C. Additionally, the nickel-copper catalyst in the filter provides a supplemental oxygen storage capacity of about 0.3 mole O/ft$^3$ to about 350 mole O/ft$^3$. The catalyst also provides a water-gas-shift activity of 50 to 100% equilibrium conversion at a temperature of between about 200° C. to 800° C.

In engine operation, the filter may be regenerated by passive regeneration in which sufficient oxygen levels and temperatures are maintained such that soot is constantly being removed from the filter. With the use of the Ni—Cu catalyst, the temperature range for soot oxidation is much broader than with prior systems, from about 200° C. to 1000° C. In addition, due to the oxygen storage capacity of the Ni—Cu catalyst, a source of oxygen for oxidizing the soot is provided even under rich engine conditions. The treatment system including the Ni—Cu catalyst burns off from about 90 to 100% of soot deposited on the filter, and preferably, provides substantially complete oxidation of $CO_2$. The Ni—Cu catalyst also provides sufficient oxygen storage capacity for soot and CO oxidation under oxygen-deficient conditions at a temperature between 200° C. and 1000° C., and provides sufficient oxygen storage capacity for $NO_x$ removal at a temperature between about 250° C. to 1000° C.

Accordingly, it is a feature of embodiments of the invention to provide a particulate filter including a nickel-copper catalyst which provides improved soot oxidation of particulates at low temperatures, which provides supplemental oxygen capacity for use in reducing CO and $NO_x$ from a vehicle exhaust, which provides low back pressure increase, and which provides further removal of CO and $NO_x$ via a water-gas-shift (WGS) reaction.

Other features and advantages of the invention will be apparent from the following description, the accompanying drawings, and the appended claims.

DETAILED DESCRIPTION OF THE PREFERRED EMBODIMENTS

Figure 1:
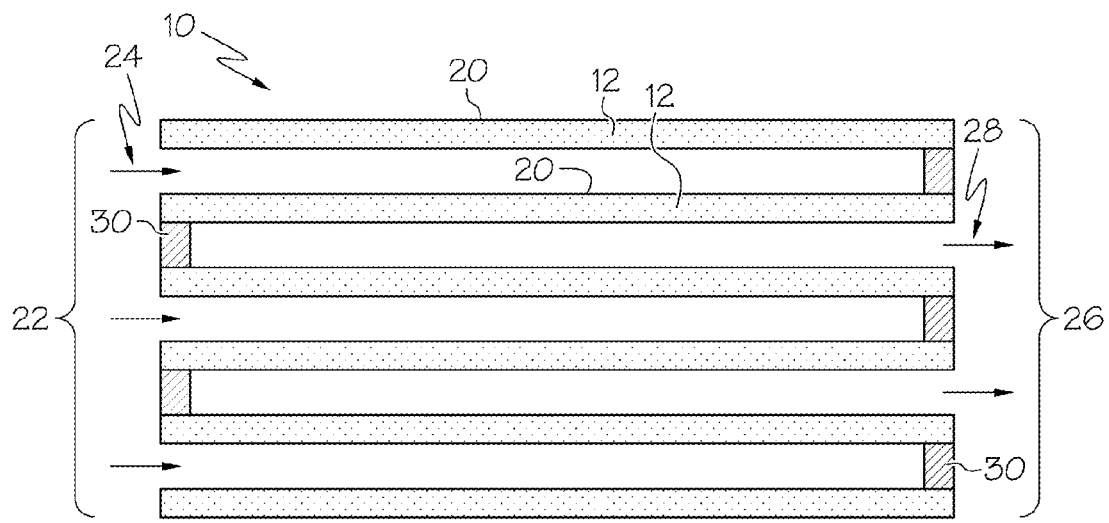
FIG. 1 is a schematic illustration of a particulate filter including a nickel-copper catalyst impregnated therein in accordance with an embodiment of the invention.

The use of a particulate filter including a nickel-copper catalyst provides an advantage over particulate filters which include washcoats containing precious metals which are supported by metal oxides such as alumina or ceria. In such washcoated filters, direct contact between the active precious metals and the deposited particulates is limited. In contrast, the catalyst comprising a mixture of nickel and copper is impregnated directly into the filter substrate from solution, which allows for direct contact between the deposited particulates and the catalyst metals. This enhanced contact and increased reduction-oxidation rates promotes the burning of the particulates deposited on the filters. Because the active metals are directly loaded without any metal oxide washcoat, the problem of engine back pressure is also minimized.

While not wishing to be bound by theory, it is believed that the use of the Ni—Cu catalyst also reduces the amount of washcoat in the filter wall, which in turn lowers the back pressure, and also increases the soot-to-catalyst contact. The Ni—Cu catalyst also provides larger oxygen-storage-capacity (OSC) values than those of conventional three-way catalyst (TWC) washcoats, providing an additional reserve of oxygen to burn off soot even under oxygen-deficient exhaust conditions such as rich engine conditions. This allows the filter to be regenerated under passive regeneration conditions, i.e., regeneration takes place under normal driving conditions where the appropriate level of oxygen and sufficient temperature are present to remove soot from the filter. This is in contrast to many current commercial filters which are regenerated using an active regeneration strategy in which extra fuel must be injected over an oxidation catalyst in order to heat up the catalyst to the appropriate temperature to promote regeneration of the filter.

In addition, the nickel-copper catalyst is highly active for water-gas-shift (WGS) reaction, thus providing efficient CO and $NO_x$ removal from exhaust gases flowing through the filter.

In addition, by utilizing nickel and copper together on a filter substrate which contains no materials which are reactive with nickel or copper, there is no potential negative interaction between the nickel and copper with reactive materials such as alumina. This is an improvement over prior TWC washcoat catalyst containing alumina. It is known that both nickel and copper will react with alumina to form nickel- and copper-aluminate. While not wishing to be bound by theory, it is believed that the deactivation of current commercial nickel-loaded three-way catalysts is attributable to the formation of nickel-aluminate. Copper can also react with alumina under severe aging conditions. Thus, by using a nickel-copper catalyst on a filter substrate which is free of reactive alumina or other reactive components, deactivation of the nickel or copper is minimized during vehicle aging.

The preferred ratio of nickel to copper in the catalyst is from 99:1 to 50:50, and most preferably, from about 50:50. It should be appreciated that the ratio of Ni:Cu may be adjusted, depending on the filter location within an exhaust aftertreatment system.

Referring now to FIG. 1, an embodiment of the particulate filter 10 is shown. As can be seen, the filter comprises a plurality of parallel channels separated by thin porous walls 20. The filter includes an inlet 22 comprising inlet channels 24 and an outlet 26 comprising outlet channels 28. The channels are open at one end and plugged at the opposite end with plugs 30 such that when particle laden exhaust gas flows through the walls, gas is able to escape through the pores in the wall material, but particulates are trapped.

In the embodiment shown, the filter includes a nickel-copper catalyst 12 which has been impregnated in the filter so that it permeates the filter walls and is substantially uniformly distributed through the substrate material comprising the filter.

The filter is preferably comprised of a porous filter substrate having a porosity of from about 40 to 70%. Suitable filter substrates for use include cordierite, aluminum titanate, silicon carbide, and mullites. Also suitable for use are metal forms and fibers. The nickel may be loaded onto the filter substrate by preparing an aqueous nickel solution of about 0.002 to 0.200 g Ni/g-solution, and preferably from about 0.100 g Ni/g-solution. The source of nickel in the solution may comprise nickel nitrate, nickel acetate, nickel carbonate, nickel sulfate, or combinations thereof.

Suitable copper compounds for loading on the filter substrate include copper nitrate, copper acetate, copper carbonate, copper sulfate, and combinations thereof. The copper is preferably provided as an aqueous solution in an amount of about 0.001 to 0.150 g Cu/g-solution, depending on the desired ratio of nickel to copper or the final loading of total Ni—Cu. It should be appreciated that the concentrations of Ni and Cu can be determined based on the final loading of Ni and Cu on the filter substrate and the amount of solution required for wetting the substrate.

The nickel and copper solutions are mixed together to form a homogeneous solution which is then impregnated directly into the filter substrate. The solution may be impregnated into the filter substrate by directly adding the solution to the filter, by soaking the filter in the solution, or by dipping the filter into a predetermined amount of solution.

The impregnated filter substrate is then dried and calcined prior to use. The impregnated filter substrate is preferably dried at a temperature between about 100° C. and 250° C. for about 1 hour and is then calcined at a temperature of between about 350° C. and 650° C. for 1 hour. The total amount of the nickel and copper mixture can be loaded in one step or by repeating the impregnation, drying, and calcining steps to build up the desired levels of catalyst loading.

It should be appreciated that additional oxidation catalysts and/or catalyst washcoats may be provided on the filter as long as they do not react with the Ni—Cu catalyst or contribute to increased back pressure.

Figure 2:
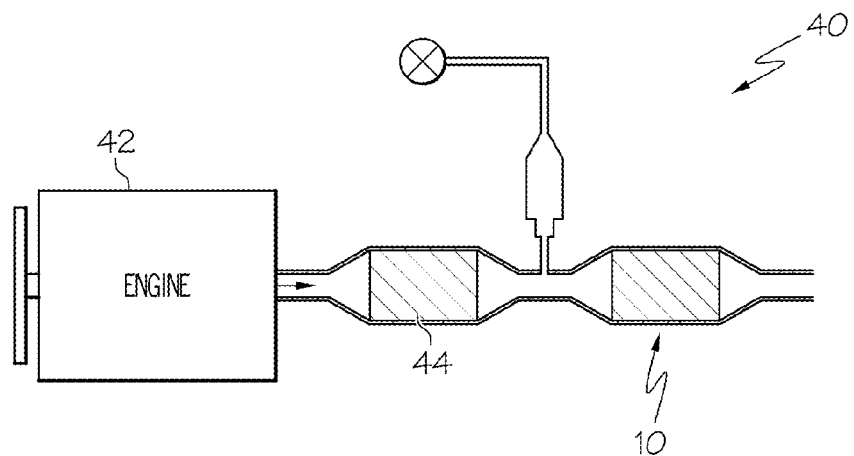
FIG. 2 is a schematic illustration of a particulate filter including a nickel-copper catalyst positioned in an exhaust treatment system in accordance with an embodiment of the invention.

Referring now to FIG. 2, an embodiment of an exhaust gas treatment system 40 including the particulate filter 10 and nickel-copper catalyst are illustrated. It should be appreciated that the particulate filter may be used in the exhaust gas treatment system of a gasoline or diesel engine. It should also be appreciated that the specific location of the filter in the exhaust gas may vary. As shown in FIG. 2, the exhaust treatment system 40 is coupled to an exhaust gas manifold 42 of an engine and includes the particulate filter 10 including the Ni—Cu catalyst. In the embodiment shown, the filter is positioned downstream from a conventional three-way catalyst (TWC) 44. The filter may also be close coupled with a TWC catalyst, i.e., mounted immediately after the TWC. Alternatively, the filter may be placed in an underbody position of the vehicle.

During operation, as exhaust gas generated by the vehicle engine passes through the exhaust gas manifold 42, it passes through the particulate filter 10 including the Ni—Cu catalyst impregnated into porous walls 20 such that catalytic conversion of CO to $CO_2$ occurs. The catalytic conversion of $NO_x$ into oxygen and nitrogen also occurs.

The large OSC of the nickel-copper catalyst also supplies extra oxygen for burning off soot under oxygen-deficient conditions that are frequently encountered in gasoline engine vehicles. The Ni—Cu catalyst also provides catalytic activity for further removal of carbon monoxide and $NO_x$ via WGS reactions, especially under oxygen-deficient conditions.

These reactions are shown below:

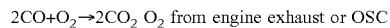
$2CO + O_2 \rightarrow 2CO_2$ $O_2$ from engine exhaust or OSC

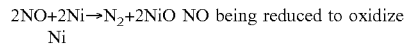
$2NO + 2Ni \rightarrow N_2 + 2NiO$ NO being reduced to oxidize Ni

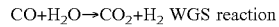
$CO + H_2O \rightarrow CO_2 + H_2$ WGS reaction

The Ni—Cu catalyst also permits filter regeneration at temperatures in the range of about 200° C. to 1000° C.

In order that the invention may be more readily understood, reference is made to the following examples which are intended to illustrate embodiments of the invention, but not limit the scope thereof.

Example 1

Figure 3A:
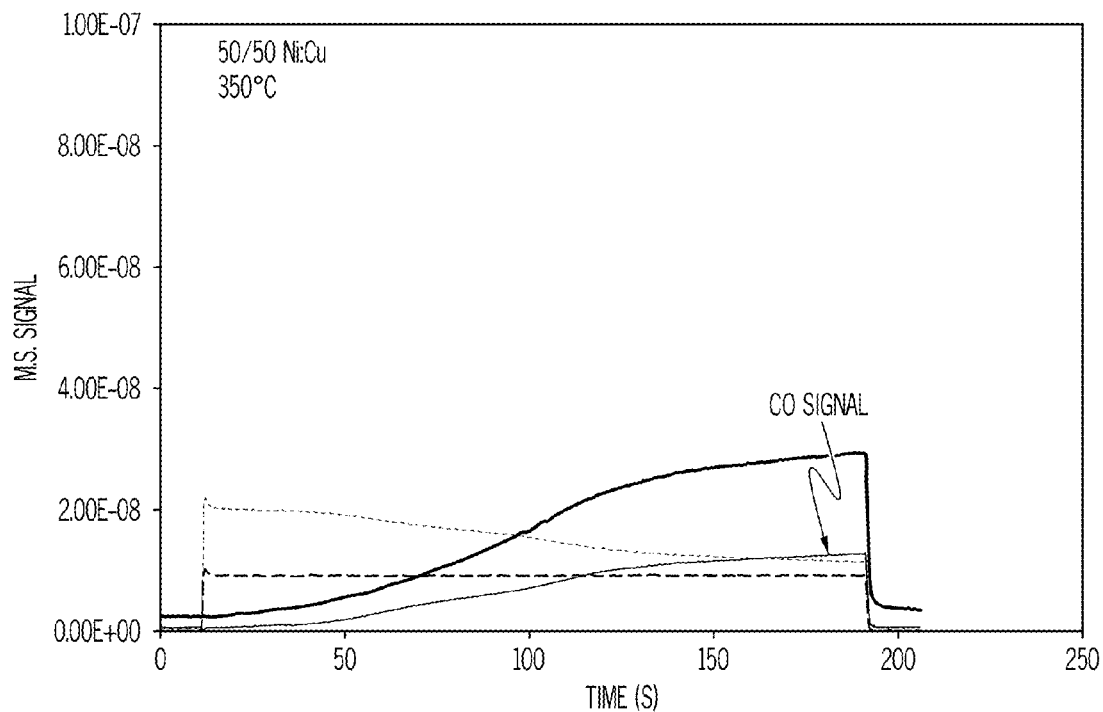
FIG. 3A is a graph illustrating the CO conversion efficiency of a nickel-copper catalyst on cordierite in accordance with an embodiment of the invention.
Figure 3B:
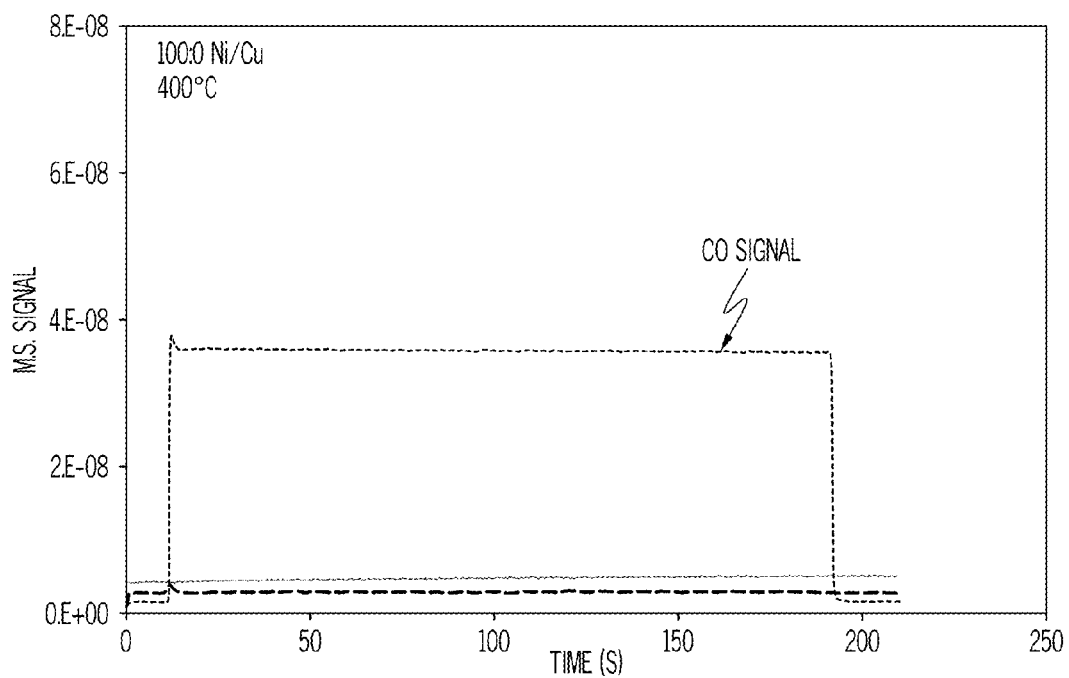
FIG. 3B is a graph illustrating the CO conversion efficiency of a catalyst containing nickel on cordierite (comparative example)

A catalyst sample loaded with 11 wt % of a nickel-copper mixture at a 1:1 Ni:Cu weight ratio was exposed to a simulated exhaust gas containing 1% CO in 10% $H_2O/N_2$ (volume %). As shown in FIG. 3A, the CO was completely removed at 350° C. A catalyst sample loaded with 12 wt % nickel (no copper) showed no CO conversion even at 400° C. under the same conditions as shown in FIG. 3B. As can be seen, the nickel-copper catalyst operates at lower temperatures and shows a greater rate of reduction/oxidation, which also indicates a greater OSC value.

Example 2

A filter substrate comprised of cordierite in a column sized at 3 inches in length and 1 inch in diameter was dipped into a 6.50 ml well-mixed solution of nickel and copper. The concentration of nickel was $2.51 \times 10^{-2}$ g. per gram solution and the concentration of copper was also $2.51 \times 10^{-2}$ g. per gram solution. After dipping, the filter substrate was turned upside down and dipped into a 6.0 ml well-mixed solution of nickel and copper with the same concentrations described above. After soaking up the solution, the filter substrate was placed into an oven at 150° C. for 30 minutes. The dried filter was then calcined in a furnace at 600° C. for 1 hour. The resulting filter (Filter A) contained 5.3 wt % nickel-copper having a Ni:Cu weight ratio of 1:1.

Example 3

A filter substrate comprised of cordierite in a column sized at 3 inches long and 1 inch diameter was dipped into a 6.50 ml solution of well mixed nickel and copper. The concentration of copper was $5.505 \times 10^{-2}$ g. nickel per gram solution and $5.499 \times 10^{-2}$ g copper per gram solution. After dipping, the wetted filter was inserted into a flow of 5 liter air per minute at 225° C. for 20 minutes. After this drying process, the other end of the filter was dipped into a 6.00 ml solution containing well mixed $5.505 \times 10^{-2}$ g. nickel and $5.499\times10^{-2}$ g copper per gram solution. The wetted filter was again inserted into a flow of 5 liter air per minute at 225° C. for 20 minutes. The dried sample was heated in air at a rate of 5° C./min. to 600° C. then held at 600° C. for 1 hour. The resulting filter (Ni—Cu Filter) contained 10.3 wt % of nickel-copper having a weight ratio of 1:1.

Figure 4:
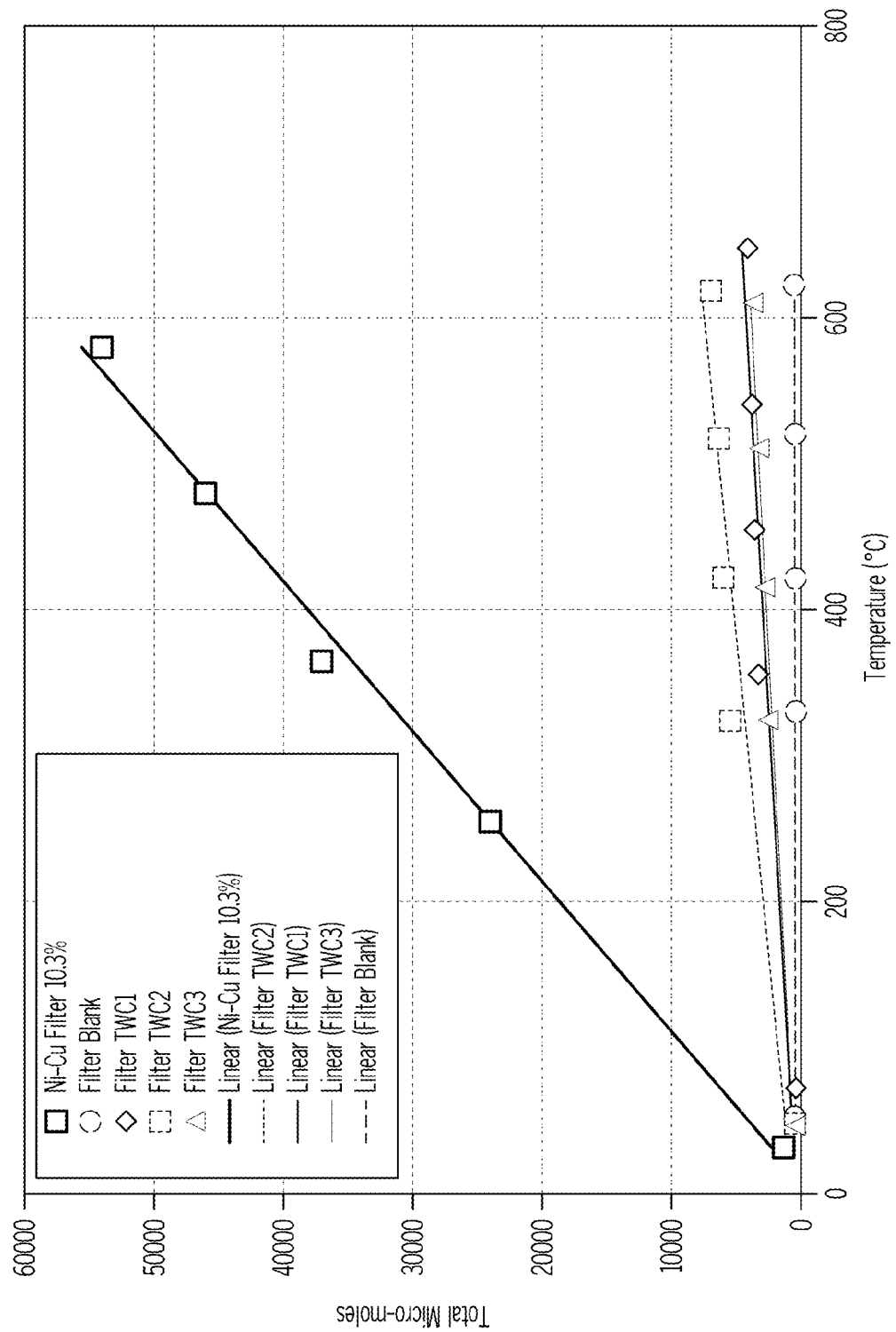
FIG. 4 is a graph illustrating the oxygen storage capacity (OSC) of a filter containing a nickel-copper catalyst in comparison with filters containing conventional TWC washcoats.
Figure 5A:
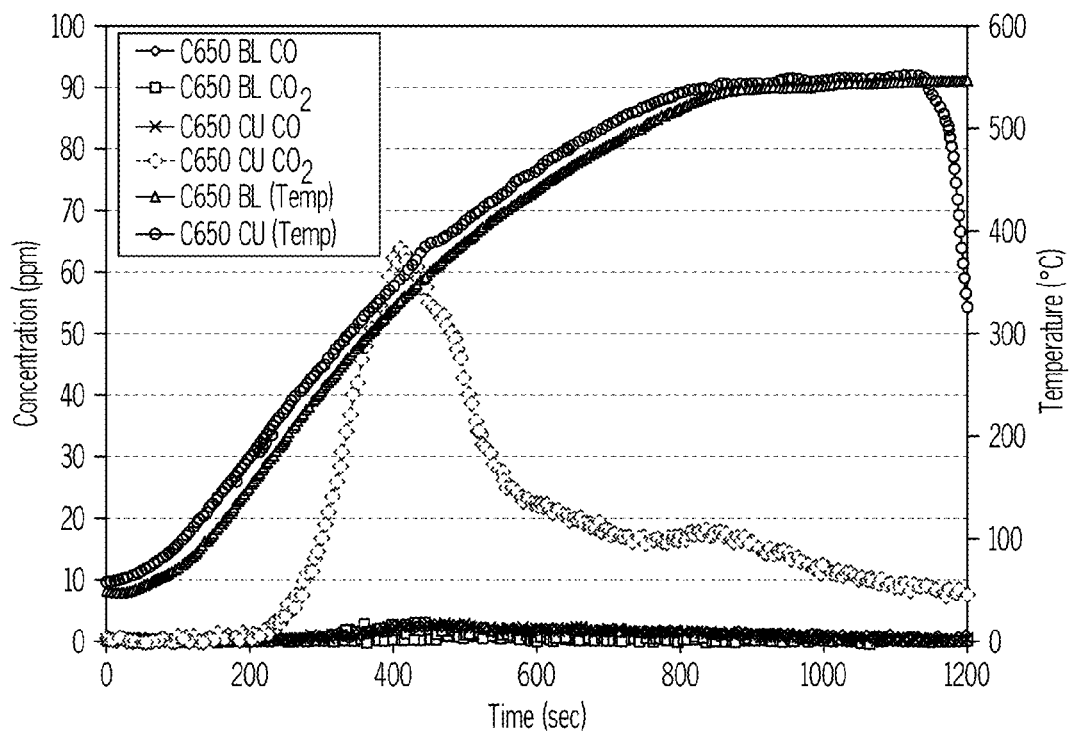
FIG. 5A is a graph illustrating $CO_2$ emissions and the regeneration of a filter containing a nickel-copper catalyst.
Figure 5B:
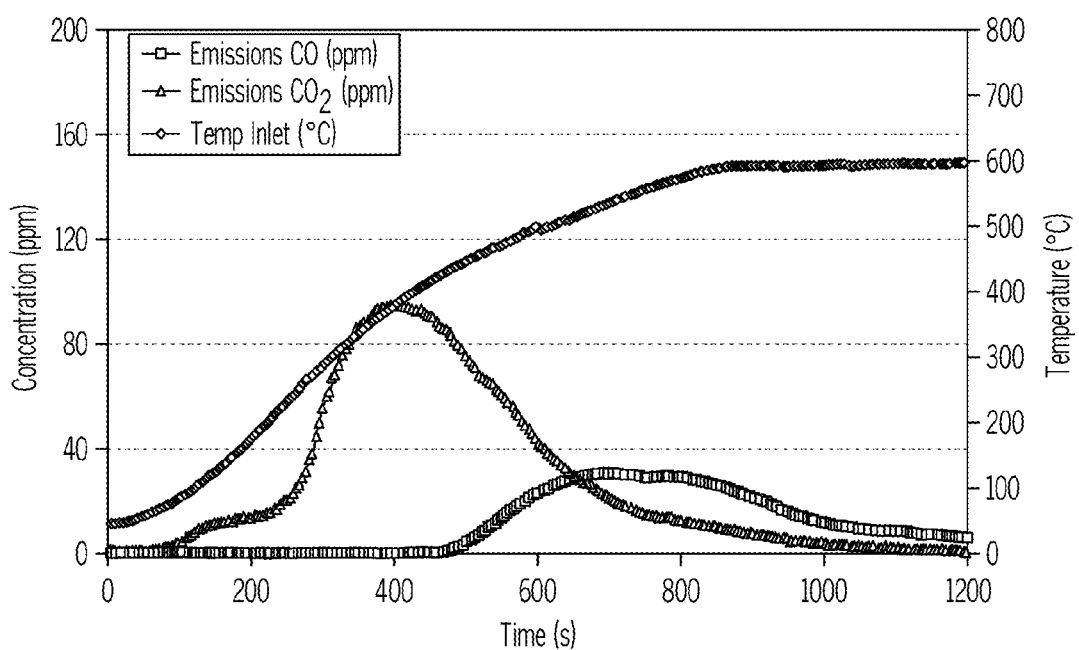
FIG. 5B is a graph illustrating $CO_2$ emissions and the regeneration of a filter containing a TWC catalyst.

FIG. 4 illustrates the oxygen-storage-capacity (OSC) of the Ni—Cu Filter in comparison with filters containing conventional TWC washcoats. As can be seen, the OSC value for the Ni—Cu filter is much larger than any of the filters with TWC washcoats. The performance of a filter blank for regeneration of particulates was evaluated and is shown in FIG. 5A in comparison with a commercial filter which contained a TWC washcoat (TWC 2) as shown in FIG. 5B. Filter substrates were loaded with approximately 0.5 g/L soot, which nearly filled the substrate walls/pores and initiated the formation of a soot cake layer. At this point, loading was stopped and regeneration was performed in the illustrated temperature range in a nitrogen-only atmosphere (no $O_2$) to see if deposited soot was removed. The 10.3 wt % nickel-copper showed an increased regeneration fraction compared to that of the TWC coated filter. The improved regeneration effect achieved with the Ni—Cu catalyst is shown in FIGS. 5A and 5B. As can be seen, FIG. 5A with 10.3 wt % nickel-copper nearly regenerated all the soot loaded on the filter substrate while FIG. 5B showed a regeneration of only about 70%.

Example 4

Ni—Cu catalyst samples impregnated into a porous filter substrate material were positioned on a particulate matter generator and regenerated on a reactor designed by Ford. The regenerator reactor used controllable $N_2$ and $O_2$ flows to provide target regeneration conditions. A Horiba air fuel ratio sensor was used to monitor $O_2$ concentrations. A data acquisition system was used to collect the signals from the emission bench, $T_{inlet}$, $T_{midbed}$, and $T_{outlet}$ thermocouples, and the volumetric flow rates of the gas species. The inlet gas mixture was heated using a high volume gas flow heater. The gas flow heater allowed the temperature of the core to be elevated to a temperature high enough to promote and sustain the regeneration event. Multiple mass flow set-points were used to enable evaluation at multiple space velocity points through distinct flow increments of 5000 $hr^{-1}$. A Lindberg/Glue furnace was used to maintain the temperature of the core at an acceptable regeneration temperature. A cold flow bench was used to record filter back pressures. The flow bench was built to handle a 200 lpm maximum flow rate in order to provide results which are representative of those observed during a traditional vehicle drive cycle such as an EPA75 or US06. Samples sizes used to evaluate back pressure and regeneration performance were 1 inch in diameter by 3 inches in length.

The inlet air to the gas flow bench was primarily a nitrogen only gas stream. The gas stream was plumbed to multiple flow controllers to allow for adjustments of steady increments from 5 lpm up to 200 lpm. Parameters that were recorded during the bench flow experiments included temperature, pressure, and volumetric flow rate.

Figure 6:
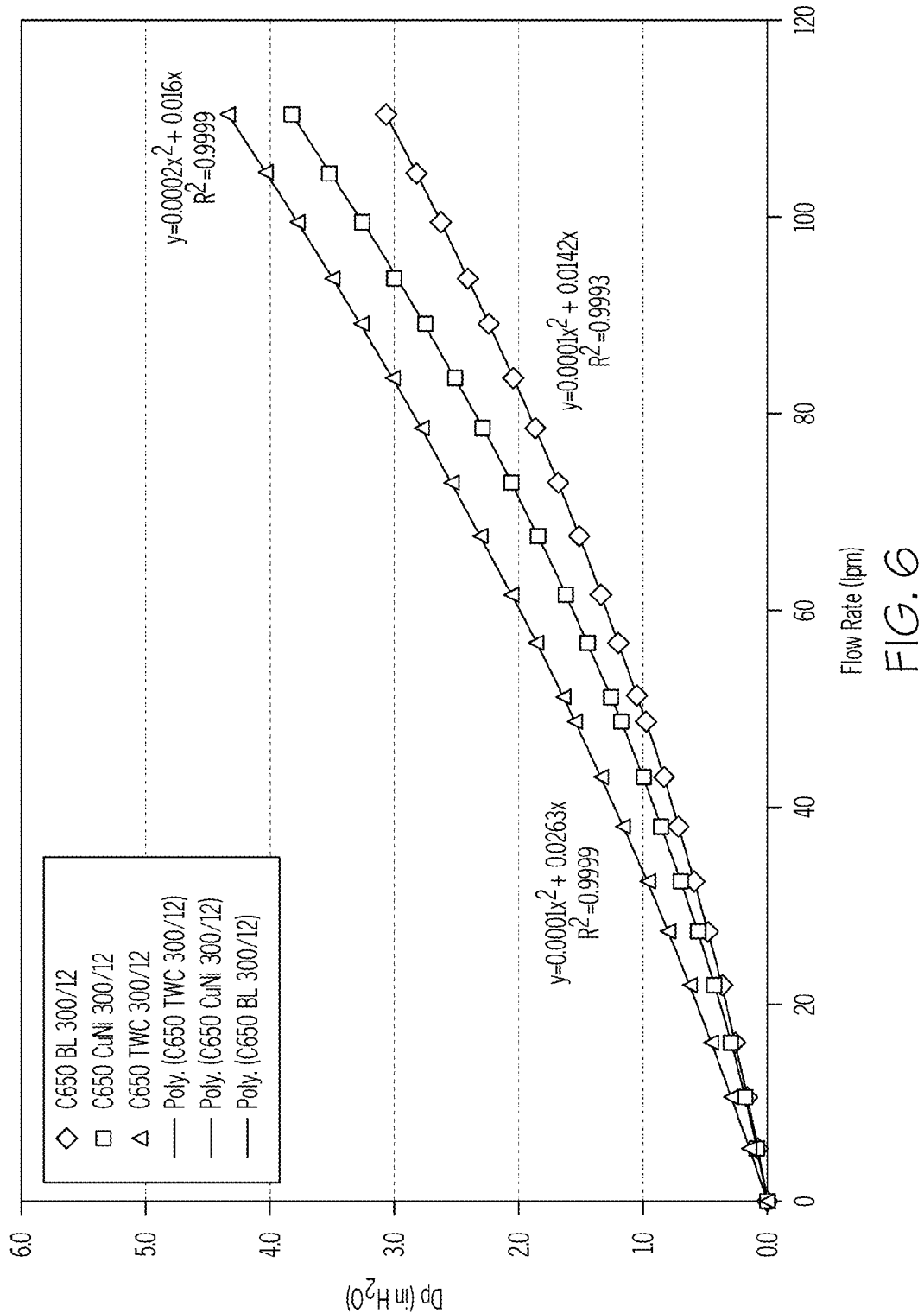
FIG. 6 is a graph illustrating pressure drop comparisons between a Ni—Cu catalyst and commercial TWC catalysts.

This example used 1×3" samples for all soot loading and back pressure experiments. The samples were wrapped in $\frac{1}{16}$" glass fiber insulation and placed in a 1 inch inner diameter stainless steel tube. Back pressure was measured and monitored during the flow bench cycle by three different range differential pressure sensors which were connected immediately upstream and downstream of the filter core to obtain the pressure drop across the core. Omega type K thermocouples were used to monitor the filter core inlet, mid-bed, and outlet temperatures during regeneration. Three differential back pressure sensors were used to measure differential pressure (Dp) which was recorded by the acquisition system. A 1, 5, and 15 psi sensor was used for each laboratory test performed. Dp measurements were performed on a blank 300/12 core sample, which was then coated as described above and evaluated a second time to quantify the coating process. The potential increase in back pressure was evaluated for a filter containing 10.3 wt. % Ni—Cu (weight ratio), a filter with a nominal TWC washcoat, and the blank filter. The results are illustrated in FIG. 6. As can be seen, the Ni—Cu coated filters showed a 10 to 15% back pressure improvement.

Having described the invention in detail and by reference to preferred embodiments thereof, it will be apparent that modifications and variations are possible without departing from the scope of the invention.

What is claimed is:

1. A particulate filter comprising:
a filter substrate; and
a catalyst comprising a mixture of nickel and copper impregnated in said substrate; wherein said filter substrate is non-reactive with nickel and copper; wherein said catalyst is substantially uniformly distributed through the substrate; and
wherein said catalyst is directly loaded without a metal oxide washcoat.

2. An exhaust treatment system comprising:
a particulate filter positioned in an exhaust stream; said particulate filter including an inlet, an outlet, and a plurality of porous walls; said particulate filter comprising a substrate including a catalyst impregnated therein comprising a mixture of nickel and copper; wherein said catalyst is substantially uniformly distributed through the substrate; and wherein said particulate filter substrate is non-reactive with copper and nickel; and
wherein said catalyst is directly loaded without a metal oxide washcoat.

3. The exhaust treatment system of claim 2 having a CO conversion efficiency of at least 90% at a temperature between about 200° C. to about 1000° C.

4. The exhaust treatment system of claim 2 wherein said particulate filter includes a plurality of channels separated by the plurality of porous walls; wherein said channels are open at one end and plugged at an opposite end to trap particulates therein.

5. The exhaust treatment system of claim 2 wherein said catalyst provides a supplemental oxygen storage capacity of about 0.3 mole O to about 350.0 mole O per cubic feet.

6. The exhaust treatment system of claim 2 wherein said catalyst provides a water-gas-shift activity of 50 to 100% equilibrium conversion of CO at about 200° C. to 800° C.

7. The exhaust treatment system of claim 2 wherein said catalyst provides regeneration of said particulate filter at a temperature of between about 200° C. to 1000° C. and burns off from about 90% to 100% of soot deposited on said particulate filter.

8. The exhaust treatment system of claim 2 wherein said catalyst provides substantially complete oxidation of soot to $CO_2$.

9. The exhaust treatment system of claim 2 wherein said catalyst provides sufficient oxygen storage capacity for soot and CO oxidation under oxygen-deficient conditions at a temperature between about 200° C. and 1000° C.

10. The exhaust treatment system of claim 2 wherein said catalyst provides sufficient oxygen storage capacity for $NO_x$ removal at a temperature between about 250° C. to 1000° C.

11. The exhaust treatment system of claim 2 wherein said substrate consists of a material selected from the group consisting of cordierite, aluminum titanate, silicon carbide, and mullites.

12. The exhaust treatment system of claim 2 wherein the catalyst is impregnated directly into the particulate filter, the catalyst permeates particulate filter walls and directly contacts deposited particulates.

13. The exhaust treatment system of claim 2 wherein said catalyst is substantially free of precious metals.

14. The exhaust treatment system of claim 2 wherein said mixture of nickel and copper is impregnated in said substrate at a loading of between about 1.0 and 50 wt. %.

15. The exhaust treatment system of claim 2 wherein said nickel is impregnated in said substrate at a loading of between about 0.1 to about 99 wt. %.

16. The exhaust treatment system of claim 15 wherein said nickel is impregnated in said substrate at a loading of about 10 wt. %.

17. The exhaust treatment system of claim 2 wherein said copper is contained on said substrate at a loading of between about 0.1 to about 99 wt. %.

18. The exhaust treatment system of claim 17 wherein said copper is impregnated in said substrate at a loading of about 10 wt. %.

19. The exhaust treatment system of claim 2 wherein a weight ratio of nickel to copper is from about 99:1 to 50:50.

20. The exhaust treatment system of claim 2 wherein said catalyst is directly impregnated in a material selected from the group consisting of cordierite, aluminum titanate, silicon carbide, and mullites.

* * * * *